US012183314B2

(12) United States Patent
Andersson

(10) Patent No.: US 12,183,314 B2
(45) Date of Patent: Dec. 31, 2024

(54) SYSTEM AND METHOD FOR PROVIDING ELECTRONIC MUSICAL SCORES

(71) Applicant: Paul Andersson, Greater London (GB)

(72) Inventor: Paul Andersson, Greater London (GB)

( * ) Notice: Subject to any disclaimer, the term of this patent is extended or adjusted under 35 U.S.C. 154(b) by 435 days.

(21) Appl. No.: 17/606,904

(22) PCT Filed: Apr. 28, 2020

(86) PCT No.: PCT/EP2020/061757
§ 371 (c)(1),
(2) Date: Oct. 27, 2021

(87) PCT Pub. No.: WO2020/221745
PCT Pub. Date: Nov. 5, 2020

(65) Prior Publication Data

US 2022/0208157 A1 Jun. 30, 2022

Related U.S. Application Data

(60) Provisional application No. 62/840,097, filed on Apr. 29, 2019.

(51) Int. Cl.
*G10H 1/00* (2006.01)
*G10G 1/00* (2006.01)

(52) U.S. Cl.
CPC ............ *G10H 1/0058* (2013.01); *G10G 1/00* (2013.01); *G10H 2220/015* (2013.01); *G10H 2240/175* (2013.01); *G10H 2240/325* (2013.01)

(58) Field of Classification Search
CPC ............... G10H 1/0025; G10H 1/0058; G10H 2240/131; G10H 2240/175;
(Continued)

(56) References Cited

U.S. PATENT DOCUMENTS 5,728,960 A 3/1998 Sitrick
5,889,860 A 3/1999 Eller et al.
(Continued)

FOREIGN PATENT DOCUMENTS

CA 2220457 A1 * 5/1998
CA 3138318 A1 * 11/2020 ............... G10G 1/00
(Continued)

OTHER PUBLICATIONS

International Patent Application No. PCT/EP2020/061757, International Search Report and Written Opinion dated Aug. 17, 2020, 4 pages.
(Continued)

*Primary Examiner* — Marlon T Fletcher
(74) *Attorney, Agent, or Firm* — Leber IP Law; Celia H. Leber

(57) ABSTRACT

A method of distribution of digital musical scores for performance by a plurality of musicians. The method includes: receiving a musical score request from a user device; obtaining, via a musical score source, a set of musical score components of a musical part for a piece of music associated with the musical score request; obtaining a transmission delay value associated with a communication path; providing, from the musical score source and using the processor, at least one of the set of musical score components to the user device using a first distribution timing based on the obtained transmission delay value; and providing a set of corresponding musical score components of a different musical part for the piece of music to a different user device based on a different transmission delay value associated with the different user device, such as to enable coordinated playback by users without a conductor.

17 Claims, 8 Drawing Sheets

(58) Field of Classification Search

CPC ....... G10H 2220/015; G10H 2240/211; G10H 2240/305; G10H 2210/111; G10H 2210/391; G10H 1/0033; G10H 7/008; G10H 2240/141; G10H 1/0083; G10H 2210/375; G10H 2240/171; G10H 2210/101; G10H 2240/295; G10H 5/007; G10H 2240/135; G10H 2240/201; G10H 2240/205

See application file for complete search history.

(56) References Cited

U.S. PATENT DOCUMENTS

| | | | | | |
|---|---|---|---|---|---|
| 6,084,168 | A * | 7/2000 | Sitrick | G09B 15/023 84/478 |
| 6,477,532 | B1 | 11/2002 | Duliege | |
| 8,119,896 | B1 | 2/2012 | Smith | |
| 8,445,766 | B2 * | 5/2013 | Raveendran | G09B 15/023 84/477 R |
| 8,552,281 | B1 | 10/2013 | Cotrone | |
| 8,779,265 | B1 * | 7/2014 | Gottlieb | G10H 1/0033 84/645 |
| 11,120,782 | B1 * | 9/2021 | Vorobyev | G10H 1/0058 |
| 2002/0165921 | A1 | 11/2002 | Sapieyevski | |
| 2003/0110926 | A1 | 6/2003 | Sitrick et al. | |
| 2008/0056491 | A1 | 3/2008 | Craig et al. | |
| 2011/0203442 | A1 * | 8/2011 | Raveendran | G10G 1/00 84/483.1 |
| 2014/0301574 | A1 * | 10/2014 | Gottlieb | G10H 1/365 381/119 |
| 2015/0268847 | A1 * | 9/2015 | Lane | G10G 1/00 715/716 |

FOREIGN PATENT DOCUMENTS

| | | | | |
|---|---|---|---|---|
| EP | 843449 | A2 * | 5/1998 | G06F 21/10 |
| KR | 20190091990 | A * | 8/2019 | |
| WO | 0150452 | A2 | 7/2001 | |
| WO | WO-2019241778 | A1 * | 12/2019 | G11B 27/031 |
| WO | WO-2020221745 | A1 * | 11/2020 | G10G 1/00 |

OTHER PUBLICATIONS

Nkoda., “Looking for Music? Then Look No Further Than Nkoda,” 4barsrest, Oct. 5, 2018, https://www.4barsrest.com/news/detail.asp?id=33883, 5 pages.

International Patent Application No. PCT/EP2020/061757, International Preliminary Report on Patentability dated Nov. 2, 2021, 8 pages.

* cited by examiner

SYSTEM AND METHOD FOR PROVIDING ELECTRONIC MUSICAL SCORES

CROSS-REFERENCE TO RELATED APPLICATIONS

This application is a national phase entry of International Patent Application No. PCT/EP2020/061757 filed Apr. 28, 2020, which claims priority to and all the benefits of U.S. Provisional Patent Application Ser. No. 62/840,097 which was filed on 29 Apr. 2019, the disclosure of which is hereby incorporated by reference in its entirety

FIELD

The present disclosure relates to music display, including but not limited to the display of electronic musical scores.

BACKGROUND

Individual musicians and musical ensembles such as orchestras, symphonies and school productions have traditionally relied on printed sheet music to guide them through their learning, rehearsals or performances. Printed sheet music is easy to play from, whether alone or in conjunction with a conductor. A large repertoire of printed sheet music needs corresponding physical storage space, and can present challenges in portability.

More recent approaches include sheet music displayed on portable electronic devices. Specialized sheet music display software is available for tablets and other devices using common mobile operating systems. Dedicated devices are also available for electronic sheet music display.

Such more recent approaches resolve some drawbacks of paper sheet music by providing the equivalent of an electronic repertoire of sheet music, or a digital songbook, addressing some issues relating to portability. However, these more recent approaches retain some limitations associated with printed sheet music, for example relating to the display or presentation of musical scores.

Improvements in the display of electronic musical scores are desirable.

BRIEF DESCRIPTION OF THE DRAWINGS

Embodiments of the present disclosure will now be described, by way of example only, with reference to the attached Figures.

DETAILED DESCRIPTION

Figure 1:
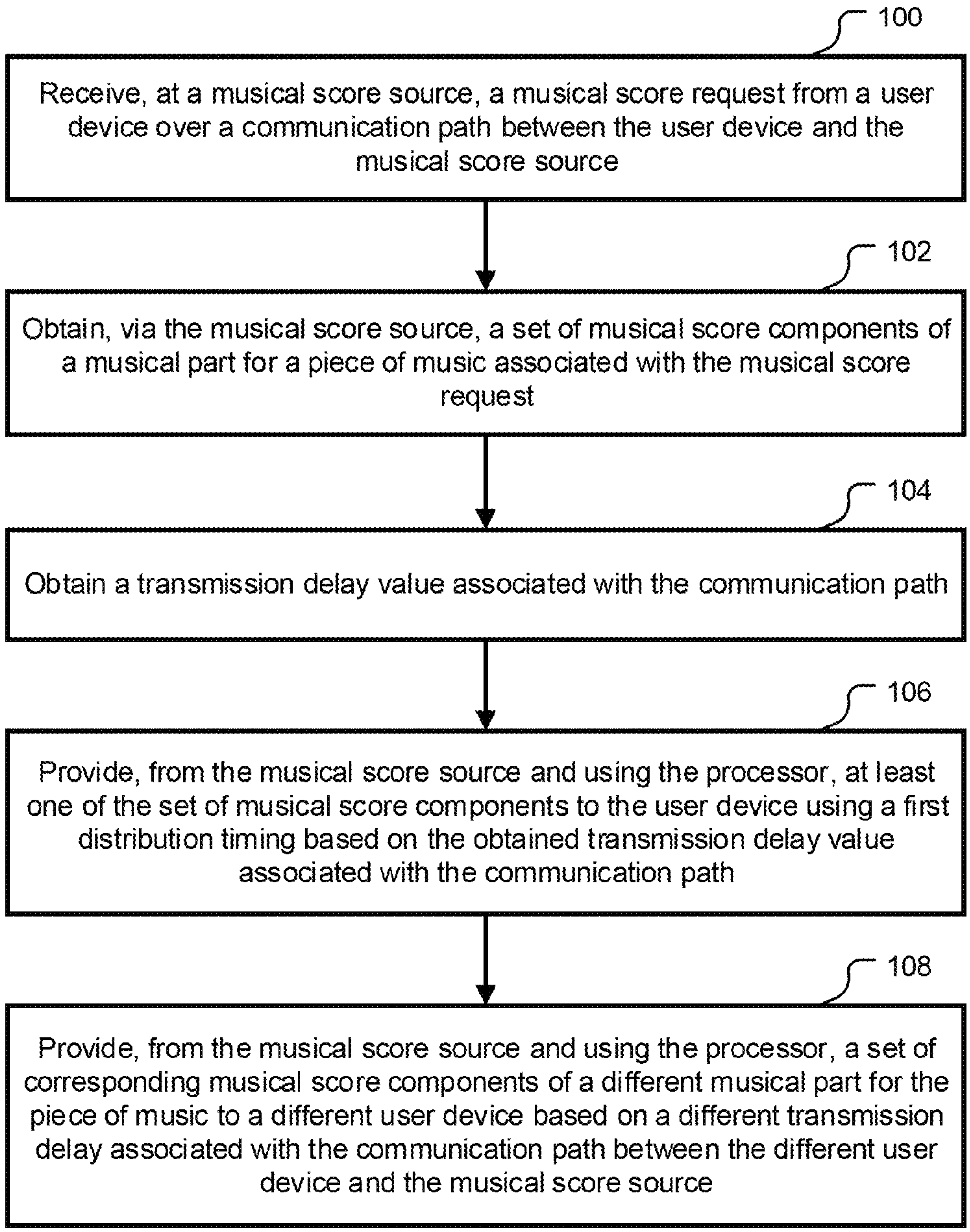
FIG. 1 is a flowchart illustrating a method of distribution of digital musical scores for performance by a plurality of musicians according to an embodiment of the present disclosure.

A method of distribution of digital musical scores for performance by a plurality of musicians, for example without a conductor. The method includes: receiving a musical score request from a user device; obtaining, via a musical score source, a set of musical score components of a musical part for a piece of music associated with the musical score request; obtaining a transmission delay value associated with a communication path; providing, from the musical score source and using the processor, at least one of the set of musical score components to the user device using a first distribution timing based on the obtained transmission delay value; and providing a set of corresponding musical score components of a different musical part for the piece of music to a different user device based on a different transmission delay, or delay value, associated with the different user device.

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

The term "musical score" represents a visual representation of musical notation, used for performing a piece of music. Sheet music, whether in printed form or electronic form, is an example of a musical score. The musical score may be a scanned version of printed sheet music, or may be a native digital or electronic representation. Since embodiments of the present disclosure are directed to digital or electronic representations of musical scores, the term "musical score" is used interchangeably with electronic musical score, or digital musical score, and is understood to represent any electronic or digital representation of a musical score.

The term "musical score component" represents a digital or electronic component of a musical score. A musical score comprises a set of musical score components. For example, if the term musical score refers to the set of all "pages" of sheet music for a particular piece of music, then a musical score component refers to any subset of all of the pages of sheet music. In an example embodiment, a musical score component can be equivalent to a "page" of sheet music, as formatted for a device on which the musical score is to be displayed. In another embodiment, a musical score component can be a musically defined section of a piece of music, for example ranging anywhere from a note, beat, mark, or bar to a whole movement, or alternatively representing a phrase, verse or chorus.

The term "musical score request" represents a request for a musical score from a musical score source. The request can be by a user, or from a user device, or both. In an implementation, in response to input from a user, the musical score request is generated at a user device, such as a computing device including a processor. For example, a user can enter the name of a piece of music via an interface provided at the computing device, such as a tablet, and the computing device's processor generates and sends a corresponding musical score request. The musical score request can include information relating to a user's desired musical part, a user's skill level, or similar parameters. In one implementation, such parameters are entered by the user. In another implementation, such parameters are obtained based on a stored user profile.

The term "musical score source" represents a source, such as an electronic database, of musical scores. In an example implementation, the database includes a plurality of "musical parts" for each piece of music, with a separate musical part being provided for each of a plurality of instrumental parts and/or vocal parts, for example for the trumpet, bassoon, guitar, and/or for soprano, alto and bass voices. In an example implementation, the musical score source comprises a database storing different musical parts having different skill or difficulty levels; for example, for the same piece of music, the database can include an easy first violin part, a moderate skill first violin part, and a complex first violin part. The different musical parts for different instruments/voices and skill levels for the same piece of music can be stored in the musical score source in a musical score package.

The term "musician" represents any person who participates in the making or producing of music. As used herein, a musician can refer to a person having any degree of experience or skill, or lack thereof, from a child taking her first ever music lesson, to a person using home-made instruments including a wooden spoon and kitchen pans, to a beatboxing street artist, to an aspiring pop vocalist, to a professional orchestra member. A musician can participate in making or producing music by vocal or instrumental means, or both, or any other type of musical contribution to a musical performance or production. A musician can use any type of standard musical notation, such as notes on a staff, or alternate/non-standard musical notation or representation used to facilitate understanding or performance.

Figure 2:
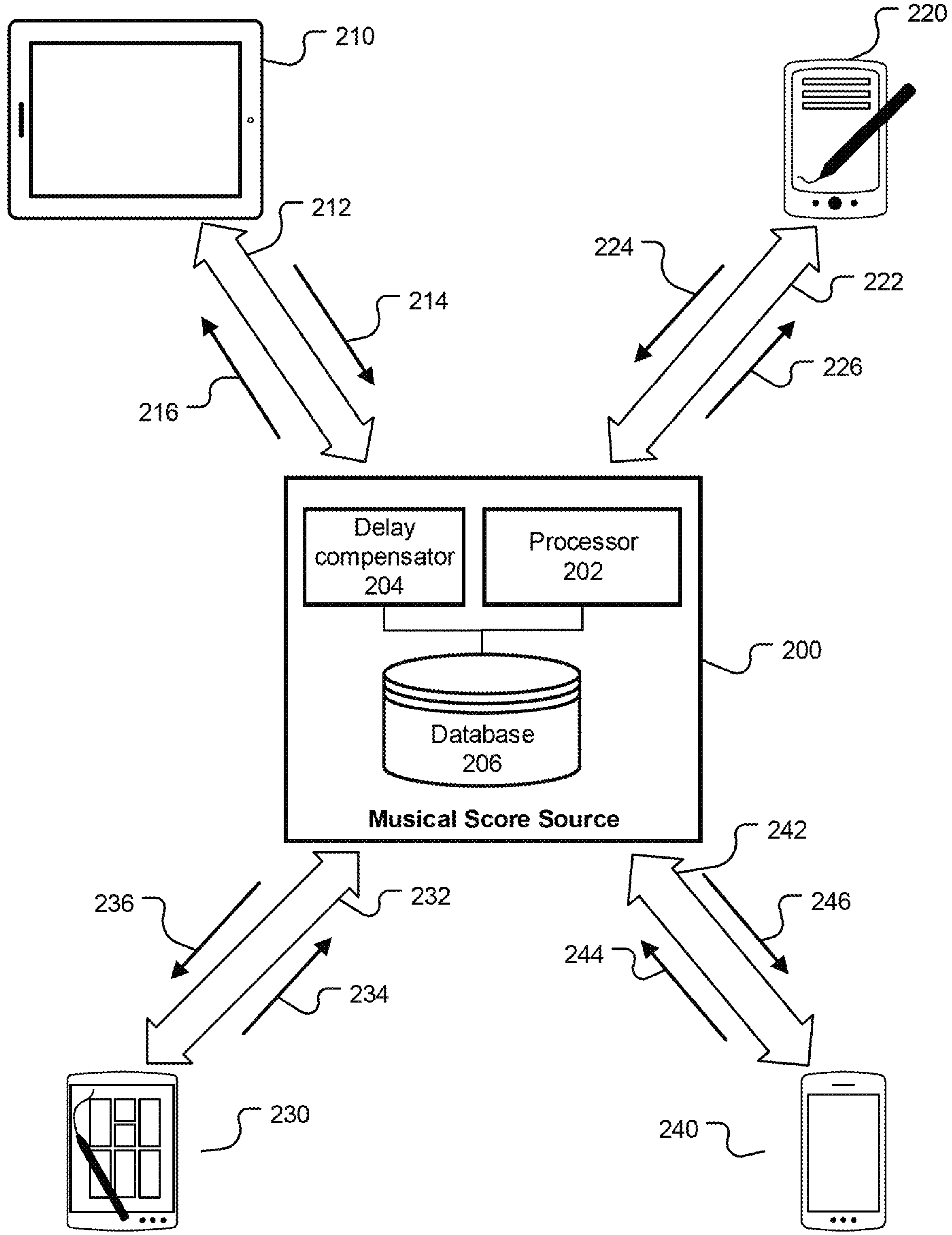
FIG. 2 illustrates a system for distribution of digital musical scores for performance by a plurality of musicians according to an embodiment of the present disclosure.

FIG. 1 is a flowchart illustrating a method of distribution of digital musical scores for performance by a plurality of musicians according to an embodiment of the present disclosure. FIG. 2 illustrates a system for distribution of digital musical scores for performance by a plurality of musicians according to an embodiment of the present disclosure. An embodiment of the present disclosure will be described in relation to both FIG. 1 and FIG. 2.

A method according to an embodiment of the present disclosure includes, at step 100; receiving, at a musical score source 200, a musical score request 214 from a user device 210 over a communication path 212 between the user device 210 and the musical score source 200. As shown in FIG. 2, the musical score source 200 can include a processor 202, a delay compensator 204, and a database 206. For example, if a first user wanted to request a violin part for the song Amazing Grace, then the musical score source 200 could receive, from the user device 210 and over the communication path 212, the related musical score request 214.

At step 102, the method includes obtaining, via the musical score source 200, a set of musical score components of a musical part for a piece of music associated with the musical score request 214. For example, if a first user requested the violin part for the song Amazing Grace, then the musical score request 214 could include "violin" as an identifier of the requested musical part and "Amazing Grace" as the piece of music. In example embodiments, the musical score request includes further detail on the musical part, such as "first violin" or "second violin", possibly adding skill level, such as "first violin, intermediate level", or "second violin, advanced level". In an example implementation, at step 102, a set of musical score components relating to the requested violin part for Amazing Grace would be obtained, where the set of musical score components could be some notes, bars or phrases of the musical score.

At step 104, the method includes obtaining a transmission delay value associated with the communication path 212. In an example embodiment, the obtained transmission delay value is used to inform how content will be provided to the requesting user device; this can be used to help coordinate providing the musical score components to multiple user devices, so that users can play together properly and while keeping proper time, for example even without a conductor. In an example embodiment, the delay compensator 204 obtains, or coordinates obtaining, the transmission delay value associated with the communication path.

In example embodiments, obtaining the first transmission delay value can comprise one or more of: obtaining a stored transmission delay value associated with the first communication path; obtaining a transmission delay value based on a delay measurement associated with the first communication path; obtaining a real-time transmission delay measurement associated with the first communication path; or measuring a transmission delay on the first communication path.

At step 106, the method includes providing, from the musical score source 200 and using a processor 202 associated with the musical score source 200, at least one of the set of musical score components to the user device 210. The step 106 is performed using a first distribution timing based on the obtained transmission delay value associated with the communication path 212. In an example embodiment, the delay compensator 204 applies, or coordinates application of, the first distribution timing to providing the musical score components to the user device.

At step 108, the method includes: providing, from the musical score source 200 and using the processor 202, a set of corresponding musical score components of a different musical part for the piece of music to a different user device. For example, the different musical part could be a saxophone part for the same musical piece Amazing Grace. In an example embodiment, as shown in FIG. 2, the corresponding musical score components 226, 236 or 246 are provided to one or more devices 220, 230 or 240, respectively. The step 108 is performed based on a different transmission delay associated with the respective communication path, such as 222, 232 or 242, between the different user device and the musical score source 200, for example based on a musical score request 224, 234 or 234.

In an example embodiment in relation to FIG. 2, the delay compensator 204 obtains, or coordinates obtaining, the transmission delay value associated with the communication path 222, 232 or 242. In another example embodiment in relation to FIG. 2, the delay compensator 204 applies, or coordinates application of, the respective distribution timings to providing the corresponding musical score components to devices 220, 230 or 240.

For example, the violin part is provided to device 210 based on a first transmission delay associated with communication path 212, and the saxophone part is provided to device 220 based on a second transmission delay associated with communication path 222. In that way, in an implementation of step 108, providing different sets of corresponding musical score components of different musical parts for the piece of music to associated different user devices is based on respective transmission delays associated with the communication path between the different user devices and the musical score source.

In an example embodiment, in step 108, providing the set of corresponding musical score components comprises providing at least one musical score component from the different musical part that corresponds with the at least one of the set of musical score components provided to the requesting user device. For example, if bars 20-34 of the violin part of Amazing Grace are provided to device 210, then bars 20-34 of the saxophone part are provided to device 220.

In an example embodiment, the set of corresponding musical score components are provided to the different user device substantially concurrently with respect to the at least one of the set of musical score components being provided to the requesting user device. For example, bars 20-34 of the saxophone part of Amazing Grace are provided to device 220 substantially concurrently with respect to bars 20-34 of the violin part being provided to device 210.

Figure 3:
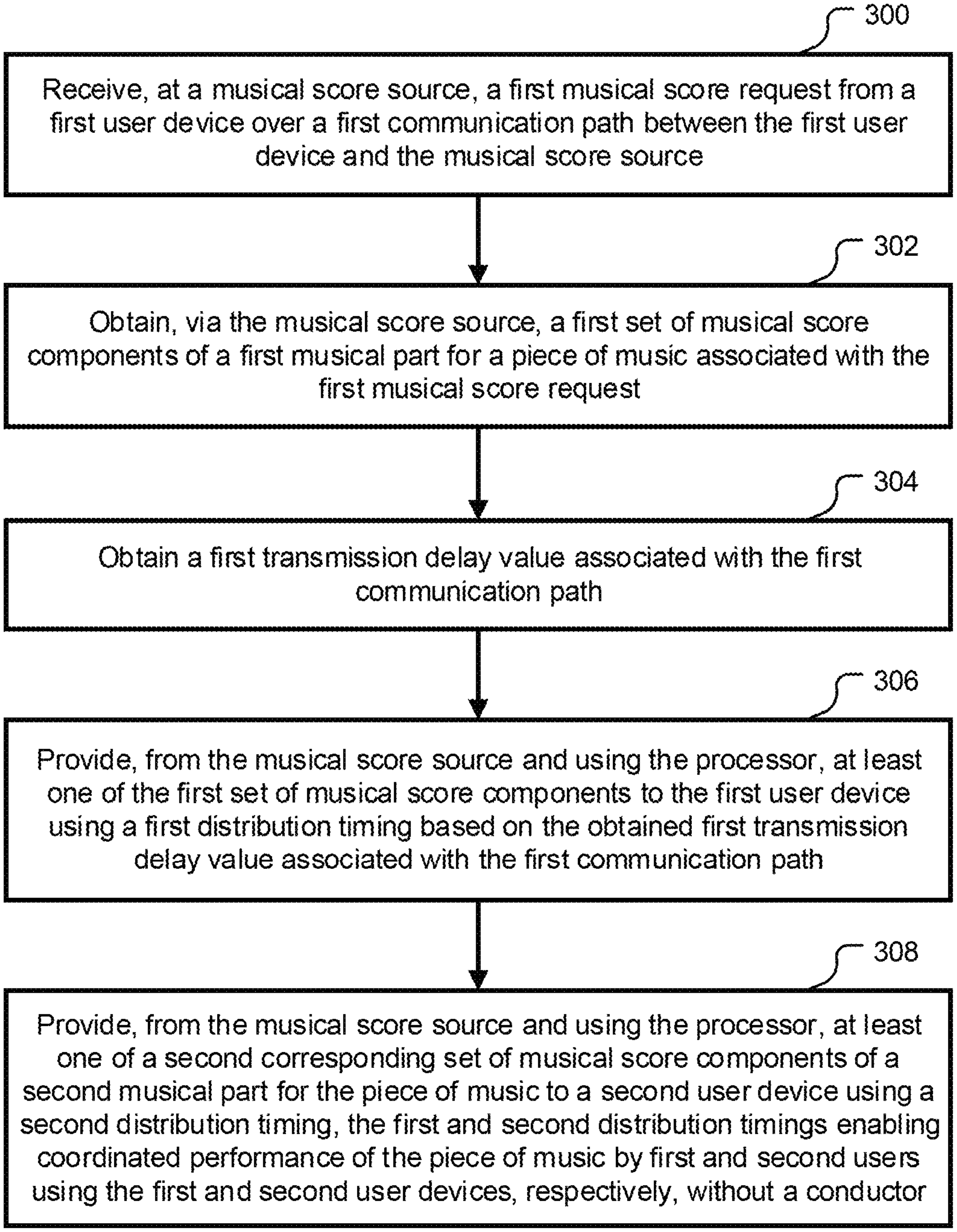
FIG. 3 is a flowchart illustrating a method of distribution of digital musical scores for performance by a plurality of musicians according to another embodiment of the present disclosure.

FIG. 3 is a flowchart illustrating a method of distribution of digital musical scores for performance by a plurality of musicians according to another embodiment of the present disclosure. FIG. 1, as described above, illustrates an embodiment including a musical score request from a user. The embodiment of FIG. 1 includes: providing at least one of a set of musical score components to the user device using a first distribution timing based on an obtained transmission delay value; and providing a set of corresponding musical score components to a different user device using a based on a different transmission delay. The method of FIG. 3 is similar to the method of FIG. 1, but explicitly recites first and second sets of musical score components being provided to first and second user devices using first and second distribution timings.

As shown in FIG. 3, the example embodiment includes: at step 300, receiving, at a musical score source, a first musical score request from a first user device over a first communication path between the first user device and the musical score source; at step 302, obtaining, via the musical score source, a first set of musical score components of a first musical part for a piece of music associated with the first musical score request; at step 304, obtaining a first transmission delay value associated with the first communication path; at step 306, providing, from the musical score source and using the processor, at least one of the first set of musical score components to the first user device using a first distribution timing based on the obtained first transmission delay value associated with the first communication path; and at step 308, providing, from the musical score source and using the processor, at least one of a second corresponding set of musical score components of a second musical part for the piece of music to a second user device using a second distribution timing, the first and second distribution timings enabling coordinated performance of the piece of music by first and second users using the first and second user devices, respectively, without a conductor.

In an example embodiment, at step 308, providing the at least one of a second set of musical score components is performed in response to a second musical score request, based on a second transmission delay associated with a second communication path between the second user device and the musical score source.

As mentioned earlier, the term musical score component represents a digital or electronic component of a musical score, where a musical score comprises a set of musical score components. In an example embodiment, providing at least one of the first set of musical score components to the first user device comprises streaming the at least one of the first set of musical score components to the first user device. Providing at least one of the first set of musical score components by streaming enables the system and method to provide the musical score components as needed, and facilitates coordination of the timing of the performance of the musical score components. Controlling how and when the musical score components are streamed makes it easier for embodiments of the present disclosure to coordinate performance timing for the users.

In an example embodiment, the first set of musical score components comprises a first set of sequential streaming portions. In such an example embodiment, the method further comprises determining a first user current performance position within the first set of sequential streaming portions, for example representing a current performance position within the entire set of musical score components for the musical piece. In such an example embodiment, streaming the at least one of the first set of musical score components to the first user device comprises providing selected streaming portions from among the first set of sequential streaming portions that are subsequent to the determined first user current performance position in the first musical part for the piece of music.

Consider an example embodiment, which occurs upon initialization or upon providing the very first set of musical score components of the piece of music. In such an example embodiment, determining the first user current performance position comprises setting the first user current performance position at the beginning of the first musical part for the piece of music in response to receiving the first musical score request. In another example embodiment, determining the first user current performance position comprises periodically querying the first user device associated with the first user to identify a currently displayed sequential streaming portion, or the sequential streaming portion to be displayed next.

In an embodiment, the first set of sequential streaming portions comprise musically-defined sections of the first musical part for the piece of music associated with the first musical score request. In a first example embodiment, the musically defined sections are selected from the group consisting of: introduction; verse; pre-chorus; chorus; bridge; solo; instrumental; and ending. In a second example embodiment, the musically defined sections are selected from the group consisting of: note; mark; bar; measure; and movement. In a third example embodiment, the musically defined sections are selected from the group consisting of:

introduction; exposition; development; recapitulation; verse; chorus; refrain; conclusion, coda; outro; fadeout; bridge; and interlude.

Various other embodiments will be evident to the skilled person in the art, providing the ability to separate the sequential streaming portions into any type or granularity of musically-defined sections, based either on currently accepted or known musical notation conventions, or variations thereof, or on visually-defined sections, or sections defined based on display characteristics. In an embodiment, the first set of sequential streaming portions comprise pages of the first musical part for the piece of music associated with the first musical score request. In a first example embodiment, the pages are defined based on the format of the first musical part for the piece of music as stored in the musical score source. In a second example embodiment, the pages are defined based on the format of the first musical part for the piece of music as displayed at the first device.

While embodiments employing streaming are advantageous, there are instances in which the ability to stream may be unreliable, such as due to communications traffic, limitations of communications infrastructure, or excessive transmission delays associated with one or more communication paths.

Accordingly, in an embodiment, for example when streaming is unreliable, the method can include receiving and/or providing a transmission delay alarm condition. In an implementation, the transmission delay alarm condition is satisfied in advance of the transmission delay having an un-reversible negative effect on the ability to properly stream the set of musical score components. That way, action can be taken before the problem results in a noticeable excessive delay, or lack of coordination between different users performing the same musical piece, after having been provided with musical score components according to an embodiment of the present disclosure.

In an example embodiment, in response to a transmission delay alarm condition, the method concurrently provides the entire first musical part for the piece of music to the first user device in parallel with the streaming. That way, if the transmission delay adversely affects the streaming, the first user device can have downloaded or otherwise been provided with the entire first musical part for the piece of music, and use that offline version of the music until the streaming conditions are more favourable. After streaming conditions are more favourable, the transmission delay alarm condition can be cleared, and the musical score components can continue to be provided using streaming, for example to assist with coordinate performance timing for the users.

In an example embodiment, the transmission delay alarm condition occurs based on the obtained first transmission delay value exceeding an acceptable first transmission delay threshold. In a first example implementation, this occurs when the obtained first transmission delay value exceeds the acceptable first transmission delay threshold by a threshold amount, and can be triggered any time the obtained value exceeds the stored threshold. In a second example implementation, this occurs when the obtained first transmission delay value exceeds the acceptable transmission delay threshold for a threshold period of time. For example, if an acceptable transmission delay threshold is 50 and the obtained value is 45 for more than 5 microseconds, then the transmission delay alarm condition occurs. In another example, if an acceptable transmission delay threshold is 50 and the obtained value is 40 for more than 12 microseconds, then the transmission delay alarm condition occurs. Different variations of the relationship between the amount by which the obtained transmission delay exceeds the threshold, and for what length of time, can be used, either independently, or together in a set of transmission delay alarm conditions.

With respect to communication between the musical score source and the user devices, embodiments of the present disclosure can provide different implementations. In one embodiment, the communication can be performed using a public or private communication network or platform, such as using a cellular data network, or WiFi connectivity over the Internet or an intranet. In some cases, such communication networks introduce uncertainty with respect to transmission delay.

In another embodiment, direct point-to-point communication is used, rather than using a communication network of some kind. For example, in an embodiment, providing the musical score components to the first user device using the first distribution timing comprises transmitting the musical score components using direct point-to-point communication between a first transceiver associated with the musical score source and a second transceiver associated with the first user device. In an example embodiment, the musical score components are transmitted using direct point-to-point communication between the first and second transceivers independent of using a network, or without using a network, for example using direct 5G communication or direct Bluetooth communication.

It can be advantageous for the system and method to provide a central coordination of timing of distribution of the musical score components. For example, in an embodiment, the first musical part for the piece of music is provided to the first user device at substantially the same time as the second musical part for the piece of music is provided to the second user device. In another embodiment, the method includes coordinating timing of display of musical parts such that the first musical part for the piece of music is displayed at the first user device at substantially the same time as the second musical part for the piece of music is displayed at the second user device.

In another embodiment, the method further comprises coordinating timing of display of streaming portions such that the selected streaming portions from among the first set of sequential streaming portions are provided to the first user device based on the first user current performance position. This is performed at substantially the same time as corresponding streaming portions of the second musical part for the piece of music are provided to the second user device based on a second user performance position corresponding to the first user current performance position.

As mentioned earlier, different musical parts for different instruments/voices and skill levels for the same piece of music can be stored in the musical score source in a musical score package. The system and method can, in example embodiments, provide requested versions based on skill level and instrument. In an example embodiment, the method can include identifying a musical score package associated with the first musical score request, where the musical score package comprises a plurality of musical parts for the piece of music; each musical part is created for a particular musical skill level and a particular instrumentation. In such an implementation, obtaining the first set of musical score components of the first musical part for the piece of music is based on the first musical score request and on a user skill level and a user instrument.

In an example embodiment, the user skill level and an identification of the user instrument are determined based on first user profile parameters associated with the first musical score request. In an example embodiment, the first user profile parameters are obtained prior to receiving the first musical score request, such as based on a query from the musical score source to the first user device to obtain the first user profile parameters, such as a query for the instrument and skill level. In another example embodiment, the user skill level and an identification of the user instrument are included in the first musical score request. In a further example embodiment, the user skill level and an identification of the user instrument are obtained based on a user identifier associated with the musical score request, for example based on a username or login credential.

So, for example, if Leila Mann signs in to a first device (tablet) using her username, then when she sends a musical score request from the tablet, the user profile parameters of instrument=violin and skill level=advanced are included as part of that musical score request. If Leila later signs in to a second device (smartphone) using the same username, then even though the request is coming from the second device, the instrument and skill level associated with her username will be included as part of that second musical score request, and not necessarily based on information relating to the device itself.

Figure 4:
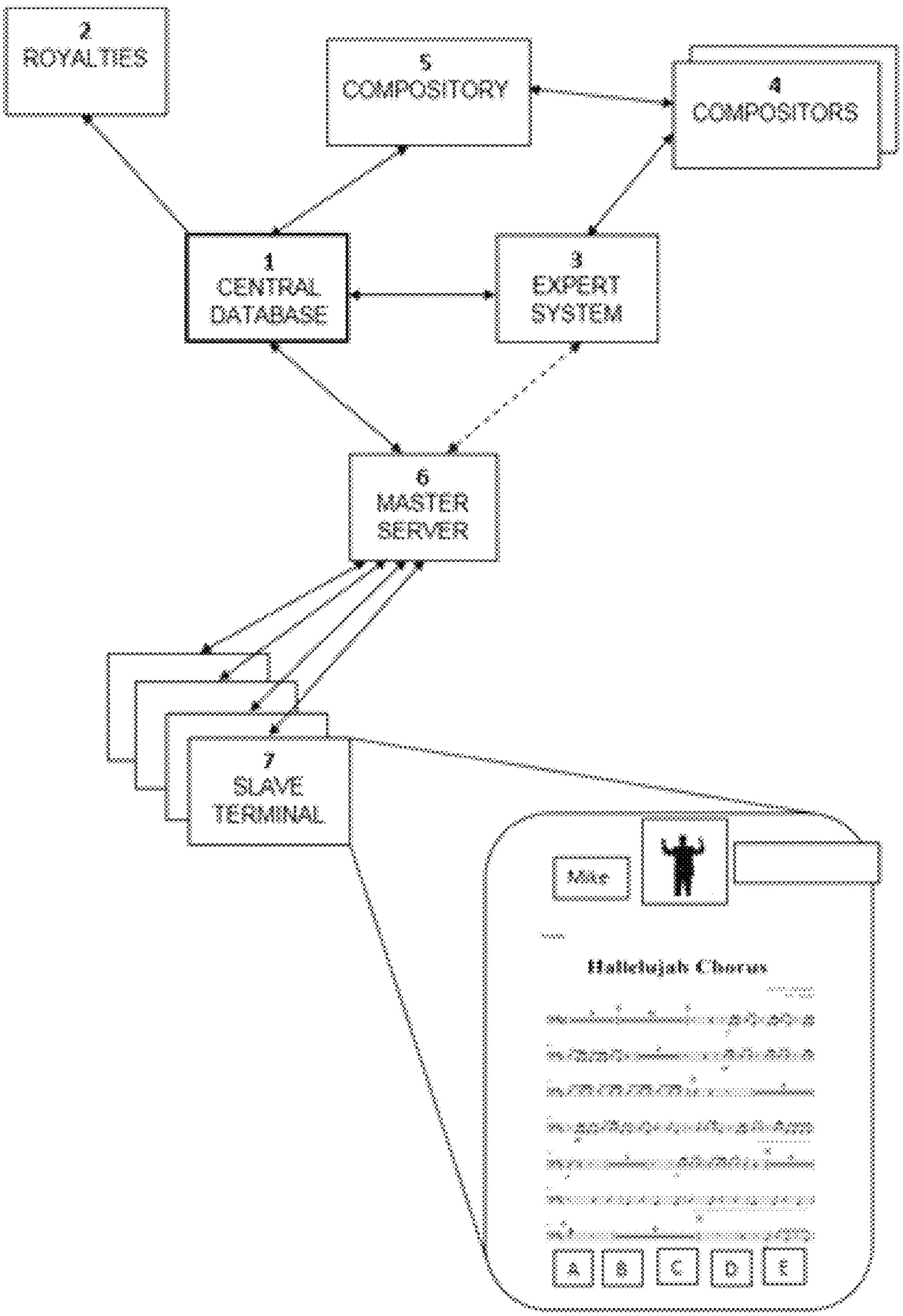
FIG. 4 illustrates a block diagram of a system for distribution of digital musical scores for performance by a plurality of musicians according to a further embodiment of the present disclosure and including additional royalty and compositor components.

FIG. 4 illustrates a block diagram of a system for distribution of digital musical scores for performance by a plurality of musicians according to a further embodiment of the present disclosure and including additional royalty and compositor components. As shown in the embodiment of FIG. 4, The central database 1 stores the original electronic versions of all musical works, which can be stored in a format such as Sibelius™ or Finale™. The database 1 also stores all variations of, or musical parts for, such a work, plus data like any royalties due, the prices for downloading the various versions of the piece, the details of all those who have modified the original, etc. All statistical performance data is held here too. The royalties file(s) 2 contain details of all royalties paid out on all downloads.

The expert system 3 in the embodiment of FIG. 4 is configured to allow anyone having appropriate authority/security permissions to modify the contents of any piece, original or changed version. In an embodiment, the expert system 3 contains rules, help text and productivity aids to make life easier for any such "compositor" to create a version of any piece of music suitable to their individual needs.

The compositors file 4 can be stored in a computer-readable memory and contains details of all those who have used the expert system to create new and modified pieces of music for the central database. The compository file 5 contains temporary versions of modified music, which await approval and/or authorisation to be placed in the central database. This temporary stage for modified versions of music, or newly composed pieces of music, allows for an interim audit process to ensure high quality versions of music in the central database. The term "compository" as used herein refers to a "composers' repository".

The server 6 can be any computer which has been designated as the lead computer for a rehearsal or performance, whether there is only one computer participating, or many. This is the computer that downloads the desired version from the central database and controls the timing and distribution of each part to be played at a locally connected terminal. The terminal(s) 7 are any user devices, such as computers/smartphones; in an example embodiment, the terminal is connected in line of sight to the server 6 and set to operate in slave mode to the server 6 which acts as master or lead computer for the group present.

Figure 5:
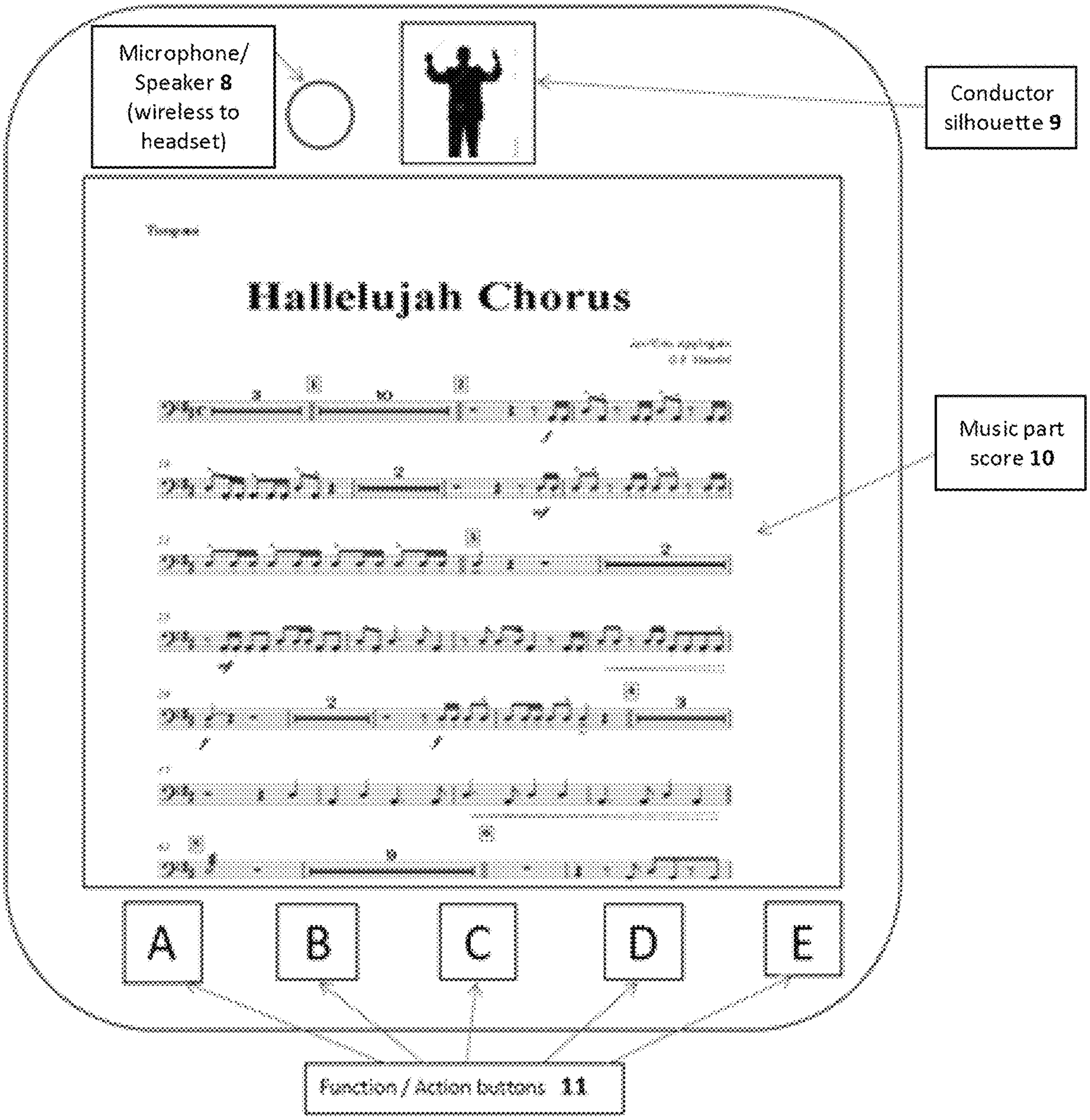
FIG. 5 illustrates an example of a display of a user device in a system for distribution of digital musical scores according to an embodiment of the present disclosure.

FIG. 5 illustrates an example of a display of a user device in a system for distribution of digital musical scores according to an embodiment of the present disclosure. The example embodiment of FIG. 5 shows an example of how any terminal (computer or smartphone) appears to a user (player or singer). A microphone/speaker 8 can be provided for communication, tuning and feedback. A moving image of a conductor in silhouette 9 can be provided, in addition to the musical score components 10, with the conductor image and the musical score being synchronised. In an example embodiment, a moving image of each note of music, with any associated notation or marks, is synchronised to the beat issued by the server. In an example embodiment, this is achieved by a moving pointer of any suitable visual form (solid line, emboldened notes, etc). The display can further include one or more multi-purpose function action buttons A-E 11, which can be allocated to functions like Tune my instrument, Change my profile skill set levels, etc.

Figure 6:
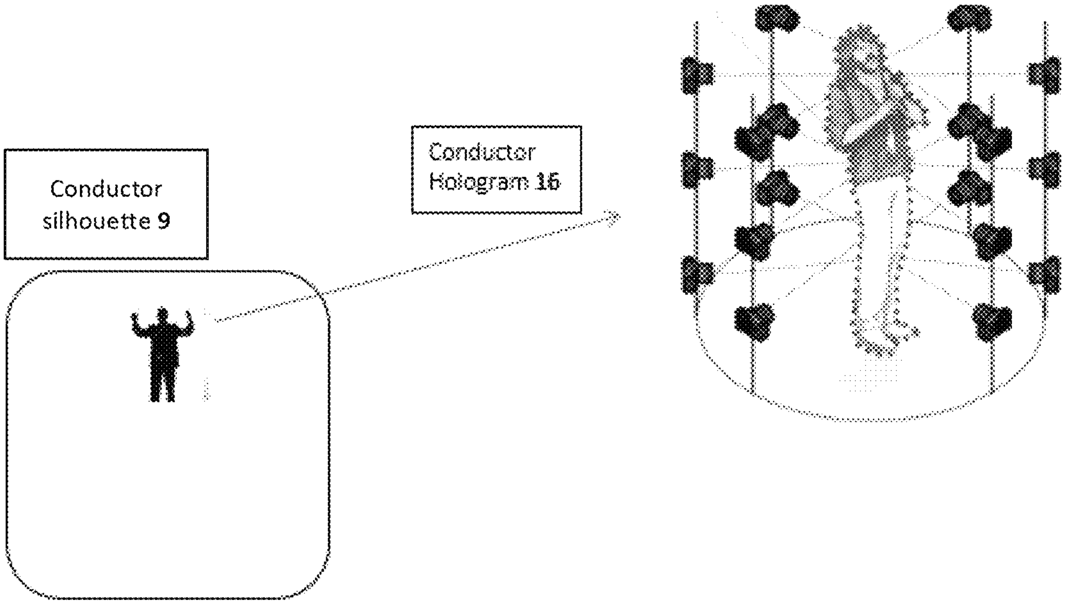
FIG. 6 illustrates an example of a display of a virtual conductor in a system and method for distribution of digital musical scores for performance by a plurality of musicians according to an embodiment of the present disclosure.

FIG. 6 illustrates an example of a display of a virtual conductor in a system and method for distribution of digital musical scores for performance by a plurality of musicians according to an embodiment of the present disclosure. The example embodiment in FIG. 6 illustrates how other technologies and solutions can be integrated with embodiments of the present disclosure. In an example embodiment, the system of the present disclosure is integrated with a capability to project 3D holograms, such as disclosed in relation to an Abba world tour. It is contemplated that instead of the band members themselves actually travelling and participating live at each venue, holograms of the Abba group will be projected on stage in each concert.

The application of this hologram technology linked to embodiments of the present disclosure enables living, and perhaps even deceased, conductors of orchestras/bands to be seen to be conducting whilst they are not actually present. This has potential to display the hologram of famous deceased conductors, provided that enough film footage of their past performances is available to convert to holograms. Major orchestras retain sheet music of performances with famous conductors, duly annotated for their specific requirements—these could be included in performances using embodiments of the present disclosure with hologram visualisations of the linked conductor, to reproduce a version of the piece true to the style and wishes of the original deceased conductor.

Figure 7:
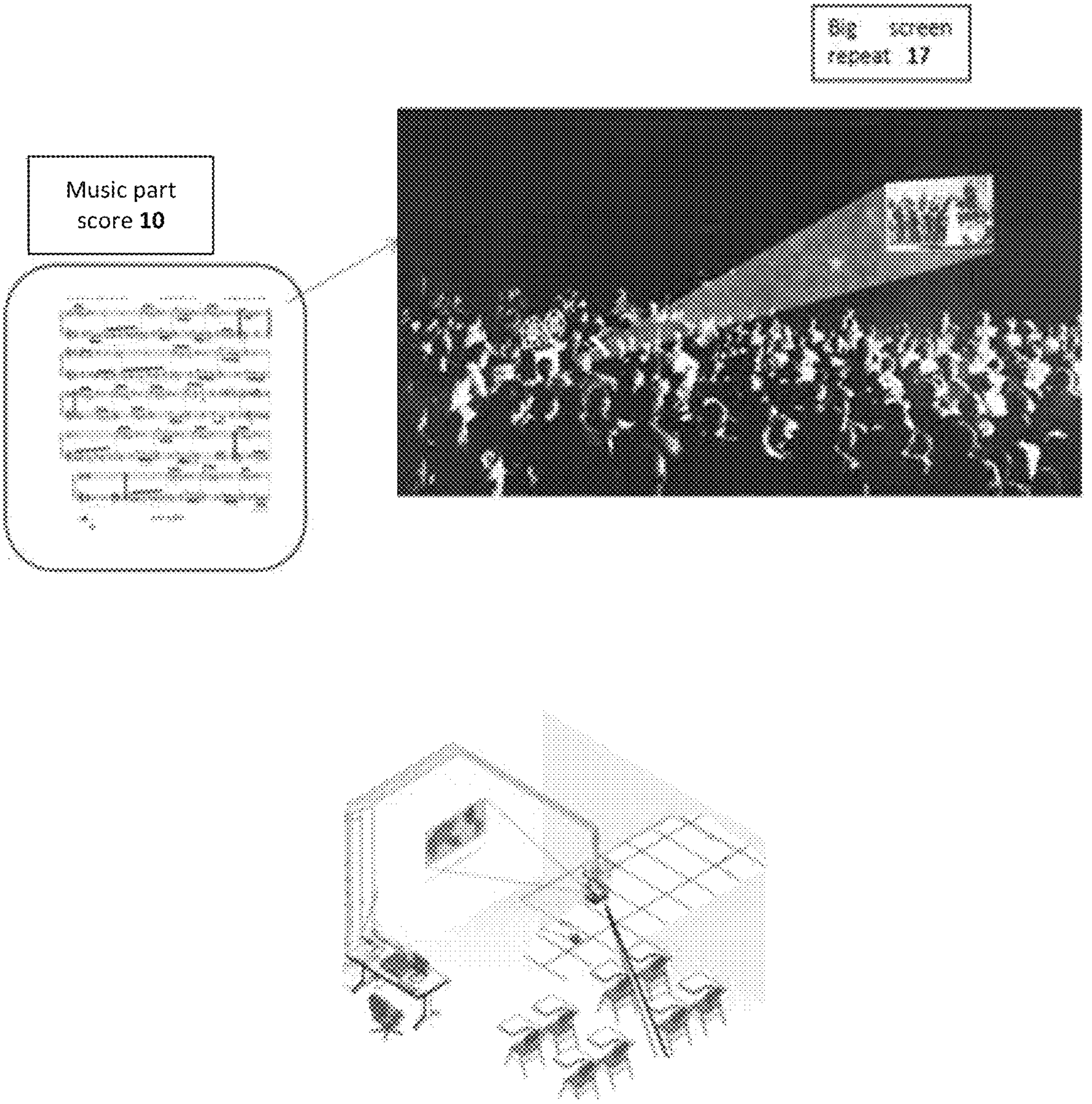
FIG. 7 illustrates an example of a public display provided in association with a system and method for distribution of digital musical scores according to an embodiment of the present disclosure.

FIG. 7 illustrates an example of a public display provided in association with a system and method for distribution of digital musical scores according to an embodiment of the present disclosure. Similar to FIG. 6, the example embodiment in FIG. 7 illustrates how another technology/solution can be integrated with embodiments of the present disclosure. Since embodiments described thus far are configured to display musical score components and other content on a user device, other embodiments extend this functionality to projecting the same content onto a large screen as in a cinema, football stadium, outside broadcast or even a commercial sales presentation. The benefit of utilising the controlling computer according to an embodiment of the present disclosure to throw one or more images onto such a screen is that an audience in the arena can then follow the music. This projected image could be programmed to cut between images of several individual parts, which might change to show main themes being played, and then video pictures of individuals or groups/sections of players.

In a further example implementation, an embodiment of the present disclosure is configured to control lighting in the area of the players/singers. The system of an embodiment of the present disclosure interfaces with the lighting systems available in the music hall, and this enables the systems to direct any light beams onto soloists or sections of the band/orchestra when their part is taking a prominent place in the music. This enables a musical performance which allows the audience to follow those parts highlighted in the music by beams of light/"spots"—and these could be dimmed and brightened according to the volume of the music. Thus the whole experience of those who attend such performances can be improved and informed, according to taste, using embodiments of the present disclosure.

In another example implementation, those parents who have suffered years of their children's violin practice could also bring along their smartphones, and "tune in" to the parts now being exquisitely played by their loved ones, thus converting the first few years of their learning a stringed instrument or an oboe (or even the drums) from an excruciatingly painful experience to a heavenly sigh of relief.

Figure 8:
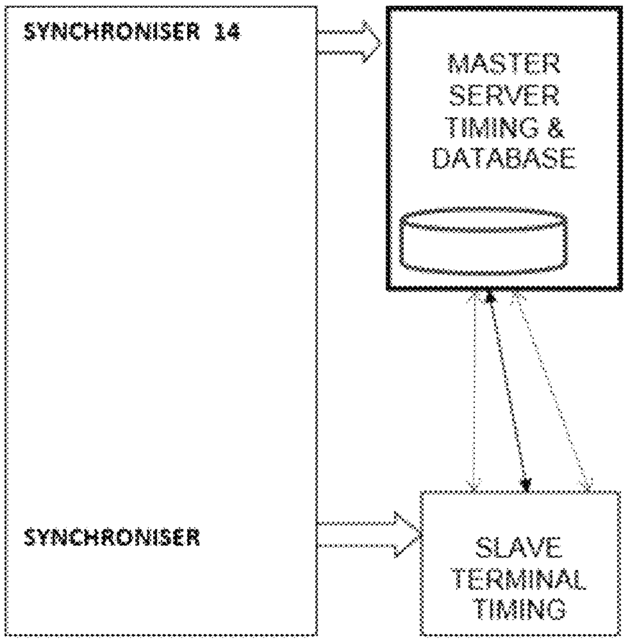
FIG. 8 illustrates a block diagram of a timing subsystem according to a further embodiment of the present disclosure.

FIG. 8 illustrates a block diagram of a timing subsystem according to a further embodiment of the present disclosure. The ability of the embodiments of the present disclosure to deliver synchronisation across all devices rests on the tight programming for communications between master computer/terminal and any number of "star"-connected slave computer/terminals and projected large screens or holograms, as in FIGS. 6 and 7 above. In an example embodiment, the timing subsystem elements shown in FIG. 8 drive the timing of the whole performance. In an example embodiment, the timing subsystem components comprise a comprehensive database of details of current and past precise communication delays between master and slave terminals. This data can be used to set and maintain accurate musical timing of the piece of music being played.

In an example embodiment, the synchronizer 14 uses 5G communication speeds to control and anticipate the timing of master and slave terminals. In an example embodiment, the subsystem also maintains the backup facility needed to present "whole page" static parts at slave terminals in case of system overload or any other emergency which stops note-by-note, or other musical score component, presentation to any terminal(s). This has been described earlier in the description.

Embodiments have been described relating to methods of, and systems for, distribution of digital musical scores for performance by a plurality of musicians. In an example embodiment, the method includes: receiving a musical score request from a user device; obtaining, via a musical score source, a set of musical score components of a musical part for a piece of music associated with the musical score request; obtaining a transmission delay value associated with a communication path; providing, from the musical score source and using the processor, at least one of the set of musical score components to the user device using a first distribution timing based on the obtained transmission delay value; and providing a set of corresponding musical score components of a different musical part for the piece of music to a different user device based on a different transmission delay value associated with the different user device, such as to enable coordinated playback by users without a conductor.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

Embodiments of the disclosure can be described with reference to the following numbered CLAUSES, with specific features laid out in the dependent clauses:

I. A method of distribution of digital musical scores for performance by a plurality of musicians, comprising:
- a. receiving, at a musical score source, a musical score request from a user device over a communication path between the user device and the musical score source;
- b. obtaining, via the musical score source, a set of musical score components of a musical part for a piece of music associated with the musical score request;
- c. obtaining a transmission delay value associated with the communication path;
- d. providing, from the musical score source and using a processor associated with the musical score source, at least one of the set of musical score components to the user device using a first distribution timing based on the obtained transmission delay value associated with the communication path; and
- e. providing, from the musical score source and using the processor, a set of corresponding musical score components of a different musical part for the piece of music to a different user device based on a different transmission delay value associated with the communication path between the different user device and the musical score source.

II. The method of clause I wherein providing the set of corresponding musical score components comprises providing at least one musical score component from the different musical part that corresponds with the at least one of the set of musical score components provided to the requesting user device.

III. The method of clause I or clause II further comprising:
- a. providing, from the musical score source and using the processor, different sets of corresponding musical score components of different musical parts for the piece of music to associated different user devices based on respective transmission delays associated with the communication path between the different user devices and the musical score source.

IV. The method of any one of clauses I to III wherein the set of corresponding musical score components are provided to the different user device substantially concurrently with respect to the at least one of the set of musical score components being provided to the requesting user device.

V. A method of distribution of digital musical scores for performance by a plurality of musicians, comprising:

a. receiving, at a musical score source, a first musical score request from a first user device over a first communication path between the first user device and the musical score source;

b. obtaining, via the musical score source, a first set of musical score components of a first musical part for a piece of music associated with the first musical score request;

c. obtaining a first transmission delay value associated with the first communication path;

d. providing, from the musical score source and using the processor, at least one of the first set of musical score components to the first user device using a first distribution timing based on the obtained first transmission delay value associated with the first communication path; and e. providing, from the musical score source and using the processor, at least one of a second corresponding set of musical score components of a second musical part for the piece of music to a second user device using a second distribution timing, the first and second distribution timings enabling coordinated performance of the piece of music by first and second users using the first and second user devices, respectively, without a conductor.

VI. The method of clause V wherein providing the at least one of a second corresponding set of musical score components is performed in response to a second musical score request, based on a second transmission delay associated with a second communication path between the second user device and the musical score source.

VII. The method of clause V or clause VI wherein obtaining the first transmission delay value comprises obtaining a stored transmission delay value associated with the first communication path.

VIII. The method of clause V or clause VI wherein obtaining the first transmission delay value comprises obtaining a transmission delay value based on a delay measurement associated with the first communication path.

IX. The method of clause V or clause VI wherein obtaining the first transmission delay value comprises obtaining a real-time transmission delay measurement associated with the first communication path.

X. The method of clause V or clause VI wherein obtaining the first transmission delay value comprises measuring a transmission delay on the first communication path.

XI. The method of any one of clauses V to X wherein providing the at least one of the first set of musical score components to the first user device comprises streaming the at least one of the first set of musical score components to the first user device.

XII. The method of clause XI wherein the first set of musical score components comprise a first set of sequential streaming portions, and the method further comprises:

a. determining a first user current performance position within the first set of sequential streaming portions; and b, wherein streaming the at least one of the first set of musical score components to the first user device comprises providing selected streaming portions from among the first set of sequential streaming portions that are subsequent to the determined first user current performance position in the first musical part for the piece of music.

XIII. The method of clause XII wherein determining the first user current performance position comprises setting the first user current performance position at the beginning of the first musical part for the piece of music in response to receiving the first musical score request.

XIV. The method of clause XII wherein determining the first user current performance position comprises periodically querying the first user device associated with the first user to identify a currently displayed sequential streaming portion.

XV. The method of clause XII wherein the first set of sequential streaming portions comprise musically-defined sections of the first musical part for the piece of music associated with the first musical score request.

XVI. The method of clause XV wherein the musically defined sections are selected from the group consisting of: introduction; verse; pre-chorus; chorus; bridge; solo; instrumental; and ending.

XVII. The method of clause XV wherein the musically defined sections are selected from the group consisting of: note; mark; bar; measure; and movement.

XVIII. The method of clause XV wherein the musically defined sections are selected from the group consisting of: introduction; exposition; development; recapitulation; verse; chorus; refrain; conclusion, coda; outro; fadeout; bridge; and interlude.

XIX. The method of any one of clauses XII to XVIII wherein the first set of sequential streaming portions comprise pages of the first musical part for the piece of music associated with the first musical score request.

XX. The method of clause XIX wherein the pages are defined based on a format of the first musical part for the piece of music as stored in the musical score source.

XXI. The method of clause XIX wherein the pages are defined based on a format of the first musical part for the piece of music as displayed at the first device.

XXII. The method of any one of clauses XII to XXI further comprising:

a. in response to a transmission delay alarm condition, concurrently providing the entire first musical part for the piece of music to the first user device in parallel with the streaming.

XXIII. The method of clause XXII wherein the transmission delay alarm condition occurs based on the obtained first transmission delay value exceeding an acceptable first transmission delay threshold.

XXIV. The method of clause XXIII wherein the obtained first transmission delay value exceeds the acceptable first transmission delay threshold by a threshold amount.

XXV. The method of clause XXIII wherein the obtained first transmission delay value exceeds the acceptable transmission delay threshold for a threshold period of time.

XXVI. The method of any one of clauses V to X wherein providing the at least one of the first set of musical score components to the first user device using the first distribution timing comprises:

transmitting the at least one of the first set of musical score components using direct point-to-point communication between a first transceiver associated with the musical score source and a second transceiver associated with the first user device.

XXVII. The method of clause XXVI wherein the at least one of the first set of musical score components is transmitted using direct point-to-point communication between the first and second transceivers independent of using a network.

XXVIII. The method of clause XXVI wherein the at least one of the first set of musical score components is transmitted using direct point-to-point communication between the first and second transceivers without using a network.

XXIX. The method of any one of clauses XXVII to XXVIII wherein the at least one of the first set of musical score components is transmitted using direct 5G communication.

XXX. The method of any one of clauses XXVII to XXVIII wherein the at least one of the first set of musical score components is transmitted using direct Bluetooth communication.

XXXI. The method of any one of clauses V to XXX further comprising:

a. providing the first musical part for the piece of music to the first user device at substantially the same time as providing the second musical part for the piece of music to the second user device.

XXXII. The method of any one of clauses V to XXXI further comprising:

a. coordinating timing of display of musical parts such that the first musical part for the piece of music is displayed at the first user device at substantially the same time as the second musical part for the piece of music is displayed at the second user device.

XXXIII. The method of any one of clauses XII to XXXII further comprising:

a. coordinating timing of display of streaming portions such that the selected streaming portions from among the first set of sequential streaming portions are provided to the first user device based on the first user current performance position at substantially the same time as corresponding streaming portions of the second musical part for the piece of music are provided to the second user device based on a second user performance position corresponding to the first user current performance position.

XXXIV. The method of any one of clauses V to XXXIII further comprising:

a. identifying a musical score package associated with the first musical score request, the musical score package comprising a plurality of musical parts for the piece of music, each musical part being created for a particular musical skill level and a particular instrumentation; and b. wherein obtaining the first set of musical score components of the first musical part for the piece of music is based on the first musical score request and on a user skill level and a user instrument.

XXXV. The method of clause XXXIV wherein the user skill level and an identification of the user instrument are determined based on first user profile parameters associated with the first musical score request.

XXXVI. The method of clause XXXV wherein the first user profile parameters are obtained prior to receiving the first musical score request.

XXXVII. The method of clause XXXV wherein the first user profile parameters are included in the first musical score request.

XXXVIII. The method of clause XXXIV wherein the user skill level and an identification of the user instrument are obtained based on a user identifier associated with the musical score request.

XXXIX. The method of any one of clauses XXXV to XXXVII wherein the user skill level and the identification of the user instrument are obtained based on a user identifier associated with the musical score request.

XL. The method of clause XXXVIII or clause XXXIX wherein the user identifier comprises a username or login credential to enable coordinated playback of the piece of music by the first and second users without a conductor.

XLI. An apparatus comprising:

i. one or more processors; and ii. memory storing computer-readable instructions that, when executed by the one or more processors, cause the apparatus to perform the method of any one of clauses I-XL.

XLII. A system comprising:

i. a computing device configured to perform the method of any one of clauses I-XL; and ii. the musical score source, iii. wherein the computing device comprises the processor associated with the musical score source.

XLIII. A computer-readable medium storing instructions that, when executed, cause performance of the method of any one of clauses I-XL.

What is claimed is:

1. A method of distribution of digital musical scores for performance by a plurality of musicians, comprising:

receiving, at a musical score source, a first musical score request from a first user device over a first communication path between the first user device and the musical score source;

obtaining, via the musical score source, a first set of musical score components of a first musical part for a piece of music associated with the first musical score request, the first set of musical score components comprising a first set of sequential streaming portions;

determining a first user current performance position within the first set of sequential streaming portions;

obtaining a first transmission delay value associated with the first communication path;

streaming, from the musical score source and using the processor, at least one of the first set of musical score components to the first user device using a first distribution timing based on the obtained first transmission delay value associated with the first communication path, including providing selected streaming portions from among the first set of sequential streaming portions that are subsequent to the determined first user current performance position in the first musical part for the piece of music;

in response to a transmission delay alarm condition, concurrently providing the entire first musical part for the piece of music to the first user device in parallel with the streaming; and providing, from the musical score source and using the processor, at least one of a second corresponding set of musical score components of a second musical part for the piece of music to a second user device using a second distribution timing, the first and second distribution timings enabling coordinated performance of the piece of music by first and second users using the first and second user devices, respectively, without a conductor.

2. The method of claim 1 wherein providing the at least one of a second corresponding set of musical score components is performed in response to a second musical score request, based on a second transmission delay associated with a second communication path between the second user device and the musical score source.

3. The method of claim 1 wherein obtaining the first transmission delay value comprises obtaining a real-time transmission delay measurement associated with the first communication path.

4. The method of claim 1 wherein determining the first user current performance position comprises setting the first user current performance position at the beginning of the first musical part for the piece of music in response to receiving the first musical score request.

5. The method of claim 1 wherein determining the first user current performance position comprises periodically querying the first user device associated with the first user to identify a currently displayed sequential streaming portion.

6. The method of claim 1 wherein the first set of sequential streaming portions comprise musically-defined sections of the first musical part for the piece of music associated with the first musical score request.

7. The method of claim 1 wherein the first set of sequential streaming portions comprise pages of the first musical part for the piece of music associated with the first musical score request.

8. The method of claim 1 wherein the transmission delay alarm condition occurs based on the obtained first transmission delay value exceeding an acceptable first transmission delay threshold.

9. The method of claim 1 wherein providing the at least one of the first set of musical score components to the first user device using the first distribution timing comprises:

transmitting the at least one of the first set of musical score components using direct point-to-point communication between a first transceiver associated with the musical score source and a second transceiver associated with the first user device.

10. The method of claim 9 wherein the at least one of the first set of musical score components is transmitted using direct point-to-point communication between the first and second transceivers independent of using a network.

11. The method of claim 1 further comprising:

providing the first musical part for the piece of music to the first user device at substantially the same time as providing the second musical part for the piece of music to the second user device.

12. The method of claim 1 further comprising:

coordinating timing of display of musical parts such that the first musical part for the piece of music is displayed at the first user device at substantially the same time as the second musical part for the piece of music is displayed at the second user device.

13. The method of claim 1 further comprising:

coordinating timing of display of streaming portions such that the selected streaming portions from among the first set of sequential streaming portions are provided to the first user device based on the first user current performance position at substantially the same time as corresponding streaming portions of the second musical part for the piece of music are provided to the second user device based on a second user performance position corresponding to the first user current performance position.

14. The method of claim 1 further comprising:

identifying a musical score package associated with the first musical score request, the musical score package comprising a plurality of musical parts for the piece of music, each musical part being created for a particular musical skill level and a particular instrumentation; and wherein obtaining the first set of musical score components of the first musical part for the piece of music is based on the first musical score request and on a user skill level and a user instrument.

15. The method of claim 14 wherein the user skill level and an identification of the user instrument are determined based on first user profile parameters associated with the first musical score request.

16. An apparatus comprising:

one or more processors; and memory storing computer-readable instructions that, when executed by the one or more processors, cause the apparatus to:

receive, at the apparatus, a first musical score request from a first user device over a first communication path between the first user device and the musical score source;

obtain, via the apparatus, a first set of musical score components of a first musical part for a piece of music associated with the first musical score request, the first set of musical score components comprising a first set of sequential streaming portions;

determining a first user current performance position within the first set of sequential streaming portions;

obtain a first transmission delay value associated with the first communication path;

stream, from the musical score source and using the processor, at least one of the first set of musical score components to the first user device using a first distribution timing based on the obtained first transmission delay value associated with the first communication path, including providing selected streaming portions from among the first set of sequential streaming portions that are subsequent to the determined first user current performance position in the first musical part for the piece of music;

in response to a transmission delay alarm condition, concurrently provide the entire first musical part for the piece of music to the first user device in parallel with the streaming; and provide, from the apparatus and using the one or more processors, at least one of a second corresponding set of musical score components of a second musical part for the piece of music to a second user device using a second distribution timing, the first and second distribution timings enabling coordinated performance of the piece of music by first and second users using the first and second user devices, respectively, without a conductor.

17. A computer-readable medium storing instructions that, when executed, cause performance of a method of distribution of digital musical scores for performance by a plurality of musicians, comprising:

receiving, at a musical score source, a first musical score request from a first user device over a first communication path between the first user device and the musical score source;

obtaining, via the musical score source, a first set of musical score components of a first musical part for a piece of music associated with the first musical score request, the first set of musical score components comprising a first set of sequential streaming portions;

determining a first user current performance position within the first set of sequential streaming portions;

obtaining a first transmission delay value associated with the first communication path;

streaming, from the musical score source and using the processor, at least one of the first set of musical score components to the first user device using a first distribution timing based on the obtained first transmission delay value associated with the first communication path, including providing selected streaming portions from among the first set of sequential streaming portions that are subsequent to the determined first user current performance position in the first musical part for the piece of music;

in response to a transmission delay alarm condition, concurrently providing the entire first musical part for the piece of music to the first user device in parallel with the streaming; and providing, from the musical score source and using the processor, at least one of a second corresponding set of musical score components of a second musical part for the piece of music to a second user device using a second distribution timing, the first and second distribution timings enabling coordinated performance of the piece of music by first and second users using the first and second user devices, respectively, without a conductor.

* * * * *